April 3, 1934.  W. B. PLUMMER  1,953,312
GAS GENERATOR FOR PULVERIZED FUEL
Filed July 27, 1928
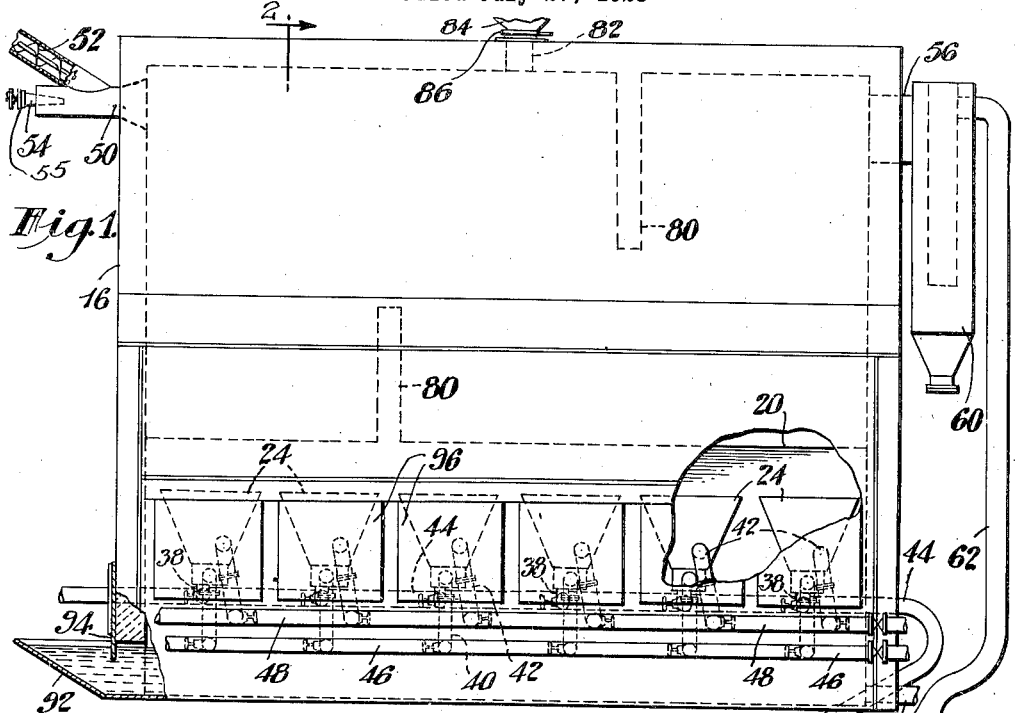
Fig. 1.
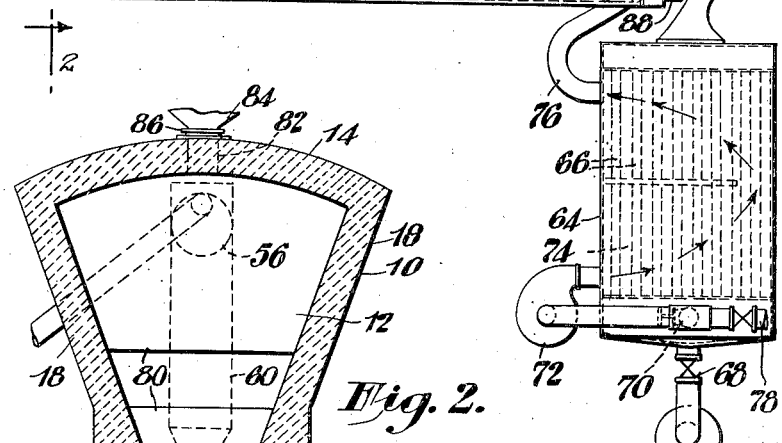
Fig. 2.
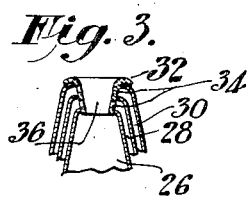
Fig. 3.
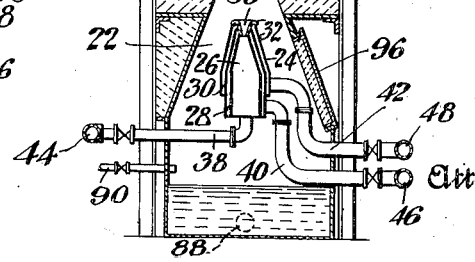
Inventor
WILLIAM B. PLUMMER
Attorney
Edmund G. Borden Patented Apr. 3, 1934

1,953,312

UNITED STATES PATENT OFFICE 1,953,312

GAS GENERATOR FOR PULVERIZED FUEL

William B. Plummer, Jackson Heights, N. Y., assignor to Combustion Utilities Corporation, New York, N. Y., a corporation of Maine Application July 27, 1928, Serial No. 295,721

14 Claims. (Cl. 48—63)

This invention relates to the manufacture of fuel gas and more particularly to apparatus for converting large volumes of finely divided carbonaceous fuel into clean high quality producer gas.

The primary object of the present invention is to provide apparatus for economically and efficiently gasifying relatively large amounts of finely divided fuel per unit volume of available gas-making space.

Another object of the invention is to provide apparatus for continuously, rapidly and substantially completely converting finely divided carbonaceous fuel into comparatively clean high quality producer gas.

In any process for carbonizing and gasifying finely divided fuel the velocity component of the gas formed in the direction of gas removal is one of the principal factors limiting the operating capacity of the apparatus employed for carrying out the process, for the reasons that as this velocity component increases more and more fuel and solid impurities are carried out of the apparatus by entrainment in the outgoing gas.

Accordingly, another object of the present invention is to provide novel means for gasifying finely divided carbonaceous fuel whereby a suitable regulation of the net velocity component of the gas formed in the direction of its point of removal to inhibit entrainment of ungasified fuel particles therewith can be effected without any serious adverse effect on the gas-making capacity of the apparatus.

Another object of the present invention is to provide means for maintaining controlled uniform or progressively increasing temperatures in the direction of net gas and fuel movement through powdered fuel gasification equipment.

Another object of the invention is to provide means whereby the complete and continuous gasification of finely divided carbonaceous fuel can be effected while simultaneously eliminating zones of excessive heat at points of fuel injection or elsewhere in the apparatus.

In accordance with this object, one feature of the invention contemplates effecting the gasification of finely divided fuel by means of oxygen supplied to the gas generator chiefly in combined form.

With the above and other objects and features in view the invention consists essentially in means whereby large volumes of finely divided carbonaceous fuel are continuously charged to and maintained in turbulent suspension in an upwardly directed relatively high velocity blast of hot products of combustion and/or air and/or steam of controlled temperature and composition; said fuel being thereby rapidly and substantially completely converted into high quality producer gas, while continuously maintaining a relatively low net velocity flow of fuel and gas formed in a lateral direction towards a point of gas removal, and a resultant minimum entrainment of ungasified fuel particles and impurities with the producer gas stream leaving the generator.

With these and other objects and features in view, the invention consists in the improved apparatus for converting finely divided carbonaceous fuel into clean high quality producer gas which is hereinafter described and more particularly defined in the claims.

The various features of the invention are illustrated more or less diagrammatically in the accompanying drawing, in which:

Fig. 1 is a diagrammatic view in vertical elevation, with parts broken away, of a gas producer of the type exemplifying the preferred form of the present invention;

Fig. 2 is a cross-sectional end view of the gas producer shown in Fig. 1 taken on the line 2—2 of Fig. 1;

Fig. 3 is an enlarged view in vertical section of the upper portion of one of the burners illustrated in Figs. 1 and 2.

The gas producer 10 which is illustrated in the accompanying drawing (see Figs. 1 and 2), consists essentially of a long relatively narrow wedge-shaped gasification chamber 12 having a roof or top closure 14 and end and side walls 16 and 18 respectively. The roof and walls of the chamber 12 are preferably formed of or lined with refractory and heat insulating material. The form of the gasification chamber 12 is preferably that of a long upright wedge or horizontally disposed trigonal chamber which is completely enclosed by an arched roof, end and side walls except for a narrow opening or throat 20 in the base of the chamber 12 and at the point of the wedge. Opening 20 extends throughout the full length of the producer and connects the chamber 12 with an underlying draft and ash or slag pit 22. A number of long narrow burners or blast nozzles 24 are mounted end to end in pit 22 in positon to project a blast or flame of air, steam and/or hot combustion supporting gases upwardly at high velocity into chamber 12 throughout its length. Each of the burners 24 in its preferred form consists of a relatively long, narrow, centrally disposed mixing or blast chamber 26 surrounded by one or more annular chambers 28 and 30. Each of the burners 24 is provided with a long, narrow tip or nozzle 32 of refractory or other high heat resistant material. Each tip 32 (see Fig. 3) has lateral openings 34 in its walls whereby communication is established between a central blast nozzle 36 and each of chambers 26, 28 and 30. Valved pipe connections 38, 40 and 42 serve respectively to conduct air, steam, combustible gas, oxygen or other material for making up the blast to the corresponding burner chambers 26, 28 and 30. The individual pipes 38, 40 and 42 supplying each of the burners are in turn supplied from manifolds 44, 46 and 48 running lengthwise of the producer outside the producer setting.

Finely divided carbonaceous fuel such as coke, lignite or bituminous coal, pitch or oil shale, is supplied to the producer through a fuel inlet 50 preferably located in an end wall of the producer near its top. The fuel is conducted to the inlet 50 from a hopper or other source (not shown) by a screw conveyor 52 or equivalent feeding means, and is projected from the inlet onto a cushion of combustion supporting gases and flames directed upwardly from the burners 24 by means of a fluid carrier such as air or producer gas supplied under pressure through a valved jet or nozzle 54.

Producer gas formed in chamber 12 is withdrawn through an off-take 56 preferably located near the top of the producer in the end opposite that in which the fuel inlet 50 is located. The offtake 56 is preferably of large cross-sectional area in order to facilitate ready control of the rate of removal of producer gas through the offtake by an exhauster 58 mounted on the gas discharge side of the apparatus. A dust separator 60 is mounted in a main 62 connecting the offtake 56 with the exhauster 58 for the purpose of separating and collecting any ash or slag particles which may be carried out of the producer chamber by the generated gases. In the drawing a recuperator 64 has also been shown in the main 62 intermediate the offtake 56 and the exhauster 58; the function of the recuperator being to effect continuous heat interchange between the generated gases and air, steam or combustible gas being supplied to the burners 24. In the recuperator design illustrated the generated gases pass through inner tubes or flues 66, and the cooled gas normally exits from the recuperator through a valved offtake 68. If desired part of the generated gas may exit from the recuperator through a valved connection 70 and be recycled by a blower 72 through a baffled chamber 74 (surrounding tubes 66 and forming the outer chamber of the recuperator) thence by a pipe 76 into manifold 44, and thence back to the producer via connections 38 and burners 24. In a case where none of the producer gas is utilized in making up the blast issuing from burners 24, air, steam or other gases used in making up the blast may be conducted to the blower 72 and the heating chamber of the recuperator by a valve pipe 78.

The inside of the producer may be provided with one or more heat resistant baffles or bridge walls 80 (see Fig. 1), for causing the fuel charged and gas formed to follow a sinuous path on its way towards the offtake 56. Likewise one or more secondary fuel inlets 82, supplied from overlying hoppers 84 controlled by feed gates 86, may be mounted in the top of the producer to insure adequate fuel feeding capacity to the producer and to provide sufficient secondary fuel to reduce the carbon dioxide content of the producer gas product of primary fuel combustion, and thereby increase the CO content and calorific value of the final generated gas withdrawn through offtake 56.

The producer illustrated is designed particularly for operation as a slagging gas producer, the slope of the walls and material of which they are composed being so chosen that the non-combustible solid components of the fuel undergoing gasification will flow or slide down the walls of the producer through the opening or throat 20 into the pit 22. If desired a flux such as lime may be introduced into the producer with the fuel charge in order to effect suitable liquefaction and slagging of the ash. Fused slag may be removed from the pit 22 through a spout 88 (see Fig. 2). In the design illustrated, however, provision is also made for quenching the slag with water or some other quenching medium. In the event that it is desired to employ water as the quenching medium it may be introduced through a pipe 90 into the pit 22 and the quenched slag may be removed from the pit through a spout 92 opening on the outside of the producer structure, a water seal being in this case maintained on pit 22 and on slide gate 94, which can be elevated sufficiently to effect removal of the quenched slag without breaking the seal.

The burner tips 32 are demountable, and several sets of these tips of varying wall thickness and nozzle capacity are preferably available so that by interchanging these tips a readier adjustment of capacity of each burner is afforded. In order to afford access to the pit 22 for cleaning and for changing burner tips and connections, doors 96 are provided in one side of the pit 22 opposite each burner.

In operation finely divided fuel (with or without a flux for the ash) may be projected into the chamber 12 continuously in controlled amounts along with a fluid carrier or vehicle such as air or hot producer gas supplied under pressure through the valved nozzle 54. The fuel thus projected into the chamber 12 is prevented from settling on the side wall of the producer prior to its complete gasification due to the cushion of hot gases directed upwardly at high velocity into the producer by burners 24. The fuel is maintained in a state of turbulent suspension in the flames of hot gases issuing from burners 24 until its gasification is complete. The ash residue of the fuel is fused by reason of the high temperatures developed and maintained in chamber 12, and the thus fused ash settles on the sloping walls of the producer and builds up into drops and fluid streams which flow downwardly through the throat 20 into the draft chamber and ash pit 22.

The producer illustrated has a length which is approximately four times its mean breadth, and a height which is approximately twice its mean breadth. The mean horizontal cross-sectional area of the producer is large, whereas the mean vertical cross-sectional area is relatively small. Likewise, as pointed out above, the mean cross-sectional area of the gas offtake 56 is relatively large. The invention contemplates a producer of the general design illustrated having a length which is preferably three or more times its mean breadth; a height at least twice its mean breadth; a bottom blast opening 20 the width of which is about one-third to one-fifth the mean breadth of the producer; and a gas offtake 56 having a diameter preferably at least one-third the mean width of the producer. By thus dimensioning the producer and by operating the exhauster 58 at a controlled low speed the net velocity flow of fuel and make gas through the producer in the direction of the offtake 56 is kept at such a low point as to inhibit entrainment of fuel particles in the gas at the time it exits through the offtake. In operating a producer of the dimensions illustrated and described, the ratio between the velocity of the blast entering the producer through opening 20 and the velocity of the exit gases leaving the producer through offtake 56 is preferably kept within a range of from 2:1 to 5:1 for best results. This velocity ratio varies somewhat with the degree of fineness of the fuel particles, with the temperatures, and with the shape and dimensions of the producer. In this connection a regulation is also maintained of the volume of fuel injected into the producer (by the valve 55 on nozzle 54) and of the volume and velocity of combustion supporting gases supplied by each of the burners 24. By adjustment of these various burner and fuel supply valves, considerable flexibility in the degree of turbulence imparted to the fuel held in suspension in the producer chamber may be obtained without disturbing the adjustments whereby entrainment of unconsumed fuel with the outgoing make gases is avoided. By means of the valves in the burner supply lines the composition, temperature and velocities of the combustion supporting gases and flames projected into the producer chamber by each of the burners 24 are separately controlled.

The thermal efficiency of the process is increased by reason of the means afforded for returning the sensible heat in the producer gas to the producer in the form of preheated blast air, steam and recycled producer gas or other components of the blast, and also by reason of the means afforded for quenching the ash or slag if desired, the heat thus developed being returned to the producer in the form of make steam.

The invention contemplates proportioning the amounts of air or oxygen, combustible gas and steam supplied to the burners 24, and the amounts of fuel supplied through the primary and secondary fuel inlets, to maintain endothermic reactions leading to the reduction of $CO_2$ content and the production of a maximum CO content in the final make gas. This result can be obtained with a producer of the design illustrated without reducing the temperatures maintained in the producer below the temperature required for properly slagging the ash. In practice the producer will preferably be operated so that the flames issuing from the burners at that end of the producer adjacent the main fuel inlet have a relatively low temperature, whereas the flames issuing from the burners in the central portion of the producer will have a relatively high flame temperature. By this method of operation the development of excessive temperatures adjacent the fuel inlet is avoided.

It will be understood that the invention is not limited to the method and apparatus hereinbefore illustrated and described, except insofar as it is defined in the claims. Thus for example combustion chambers separated by heat resistant partitions may be used in place of the burners 24 illustrated in the drawing, and a portion of the hot raw producer gas may be recycled to such burners or combustion chambers without being first passed through heat interchange apparatus.

The invention having been thus described, what is claimed as new is:

1. In gas generating apparatus, the combination of an horizontally elongated upright wedge-shaped producer gas generating chamber, means for injecting finely divided solid fuel and a fluid carrier therefor at a controlled rate into one end of said chamber, means for directing hot combustion-supporting gases at high velocity upwardly into said chamber through a narrow opening in the base thereof, means for removing the gases formed from said chamber at a controlled slow rate through an offtake in the end of said chamber opposite the point of fuel injection, and means for controlling the temperature, composition and velocity of said combustion-supporting gases.

2. In a gas generating apparatus, the combination of an elongated upright wedge-shaped producer gas generating chamber, means for injecting finely divided solid fuel and a fluid carrier therefor at a controlled rate into one end of said chamber, means for directing hot combustion-supporting gases at high velocity upwardly into said chamber through a narrow opening in the base thereof, extending substantially the full length of the chamber, means for removing gases formed from said chamber at a controlled slow rate through an offtake in the end of said chamber opposite the point of fuel injection, and means for introducing a secondary supply of finely divided fuel into said producer chamber in controlled amounts.

3. In gas generating apparatus, the combination of an elongated upright wedge-shaped producer gas generating chamber, means for injecting finely divided solid fuel and a fluid carrier therefore at a controlled rate into one end of said chamber, means for directing hot combustion-supporting gases at high velocity upwardly into said chamber through a narrow opening in the base thereof, means for removing the generated producer gas formed from said chamber at a controlled slow rate through an offtake in the end of said chamber opposite the point of fuel injection, a heat recuperator in a gas main leading off from said gas offtake, and means for recycling a portion of the generated gas in heat interchanging relationship with the main body of gas removed through said offtake and thence into the producer through said directing means.

4. In a gas generating apparatus, the combination of an elongated upright-wedge-shaped producer gas generating chamber, means for injecting finely divided solid fuel and a fluid carrier therefor at a controlled rate into one end of said chamber, means for directing hot combustion-supporting gases at high velocity upwardly into said chamber through a narrow opening in the base thereof, means for removing the generated producer gas formed from said chamber at a controlled slow rate through an offtake in the end of said chamber opposite the point of fuel injection, and means for preheating the combustion supporting gases by heat interchange with the generated gas removed through said offtake.

5. In gas generating apparatus, the combination of an elongated upright wedge-shaped producer gas generating chamber, means for injecting finely divided solid fuel and a fluid carrier therefor at a controlled rate into one end of said chamber, means for directing hot combustion-supporting gases at high velocity upwardly into said chamber through a narrow opening in the base thereof, means for removing gases formed from said chamber at a controlled slow rate through an offtake in the end of said chamber opposite the point of fuel injection, and a slag spout in a pit beneath said producer for removing fused ash produced therein.

6. In gas generating apparatus, the combination of an elongated upright wedge-shaped producer gas generating chamber, means for injecting finely divided solid fuel and a fluid carrier therefor at a controlled rate into one end of said chamber, a draft chamber and ash pit immediately below said chamber connected therewith by a narrow blast throat extending the full length of the producer chamber, a plurality of gas burners mounted end to end in said draft chamber in position to direct flames of combustion-supporting gases upwardly at high velocity into said producer, separate means for supplying hot combustible gas, air and steam to each of said burners in controlled amounts, a gas offtake of relatively large cross-sectional area in the end of said producer opposite the point of fuel injection, and means for supplying a fluid ash-quenching medium to said ash pit.

7. In gas generating apparatus, the combination of an elongated wedge-shaped producer gas generating chamber having end walls and horizontally elongated steep downwardly-converging opposite side walls, means in an end wall for projecting finely divided solid fuel and fluid into the chamber and longitudinally thereof, means in the opposite end wall for removing from the chamber the producer gas generated, the base of the said chamber being provided with a narrow restricted throat extending substantially throughout its length, and means disposed below the said throat and adapted for directing aligned high velocity stream of hot combustion-supporting gases upwardly into the said chamber substantially throughout the length of the said throat.

8. In gas generating apparatus, the combination of an elongated wedge-shaped producer gas generating chamber having end walls and steep, downwardly-converging opposite side walls, the said chamber having a length approximately three times its mean breadth and a height approximately twice its mean breadth, means in an end wall for projecting finely divided solid fuel and fluid into the chamber, means in the opposite end wall for removing from the chamber the producer gas generated, the base of the said chamber being provided with a narrow restricted throat extending substantially throughout its length, and means disposed below the said throat and adapted for directing a high velocity stream of hot combustion-supporting gases upwardly into the said chamber substantially throughout the length of the said throat.

9. Gas generating apparatus, comprising a horizontally-disposed elongated gasification chamber of V-shaped transverse vertical section, means for projecting finely divided solid fuel into the said chamber longitudinally thereof through the upper portion of an end wall, means in the upper portion of the opposite end wall for laterally removing from the chamber the producer gas formed therein, the base of the chamber being provided with a narrow longitudinally-extending throat therein, a closed chamber disposed below the gasification chamber and in communication therewith through the said throat, and means in the said closed chamber and adapted to project upwardly at high velocity a longitudinally-elongated sheet of hot combustion-supporting gases into the gasification chamber through the said throat.

10. Gas generating apparatus, comprising a horizontally-elongated retort having end walls and steeply sloping side walls, the said retort having a vertical mid-portion constricted to form a throat extending substantially the length of the retort and establishing communication between an upper gas generating chamber and a lower burner chamber, means in the burner chamber adapted to direct a high velocity stream of hot combustion-supporting gases of preselected composition and temperature upwardly through the said throat along substantially its entire length, means in one end of the gas generating chamber adapted to project finely divided solid fuel into the same, and means for removing from the upper part of the opposite end wall of the gas generating chamber the producer gas generated.

11. Gas generating apparatus, comprising a horizontally-elongated retort having end walls and steeply sloping side walls, the said retort having a vertical mid-portion constricted to form a throat extending substantially the length of the retort and establishing communication between an upper gas generating chamber and a lower burner chamber, means in the burner chamber adapted to direct a high velocity stream of hot combustion-supporting gases of preselected composition and temperature upwardly through the said throat along its entire length, means for controlling the temperature, composition and velocity of the stream of combustion supporting gases, means in one end of the gas generating chamber adapted to project finely divided fuel into the same, and means for removing from the upper part of the opposite end wall of the gas generating chamber the producer gas generated.

12. Gas generating apparatus having in combination, an elongated gas generating chamber having end walls, steep downwardly converging side walls, means for introducing finely divided solid fuel laterally into the chamber through an end wall, means for removing generated gases laterally from the chamber through the upper portion of the opposite end wall, a burner chamber disposed below the gas generating chamber and in communication with the latter through an elongated narrow passageway, means disposed in the burner chamber adapted for directing a high velocity stream of hot combustion-supporting gases upwardly through the throat and into the gas generating chamber substantially throughout the length of the latter, and baffle means depending from the top of the gas generating chamber and interposed between the solid fuel introducing means and the said generated gas removing means.

13. In gas generating apparatus, the combination of a horizontally-elongated wedge-shaped producer gas generating chamber, means for injecting finely divided solid fuel and a fluid carrier therefor at a controlled rate into one end of the said chamber, a draft chamber and ash pit disposed immediately below the gas generating chamber and connected therewith by a constricted narrow blast throat extending substantially throughout the length of the said chamber, a plurality of vertically-disposed long narrow burners mounted end to end in the said draft chamber, each of the burners being adapted to direct a high velocity stream of combustion-supporting gases upwardly through the narrow throat and into the gas generating chamber through a separate portion of the throat, and independent valve-controlled means connecting each burner respectively with a source of air, a source of steam and a source of a combustible gas, and a gas offtake of relatively large cross-sectional area in the end wall of the gas generating chamber opposite that having the solid fuel injection means.

14. In gas generating apparatus, the combination of a horizontally-elongated wedge-shaped producer gas generating chamber, means for injecting finely divided solid fuel and a fluid carrier therefor at a controlled rate into one end of the said chamber, a draft chamber and ash pit disposed immediately below the gas generating chamber and connected therewith by a constricted narrow blast throat extending substantially throughout the length of the said chamber, a plurality of vertically-disposed long narrow burners mounted end to end in the said draft chamber, a refractory burner tip having lateral openings mounted on each burner, each of the burners being adapted to direct a high velocity stream of combustion-supporting gases upwardly through the narrow throat and into the gas generating chamber through a separate portion of the throat, and independent valve-controlled means connecting each burner respectively with a source of air, a source of steam and a source of a combustible gas, and a gas offtake of relatively large cross-sectional area in the end wall of the gas generating chamber opposite that having the solid fuel injection means.

WILLIAM B. PLUMMER.